US012219341B2

(12) United States Patent
Shih et al.

(10) Patent No.: US 12,219,341 B2
(45) Date of Patent: Feb. 4, 2025

(54) SYSTEM AND METHOD FOR VIRTUAL SOUND EFFECT WITH INVISIBLE LOUDSPEAKER(S)

(71) Applicant: HARMAN INTERNATIONAL INDUSTRIES, INCORPORATED, Stamford, CT (US)

(72) Inventors: Shao-Fu Shih, Stamford, CT (US); James Zheng, Shenzhen (CN); ZhuoChao Zheng, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 135 days.

(21) Appl. No.: 17/788,452

(22) PCT Filed: Dec. 30, 2020

(86) PCT No.: PCT/US2020/067466
§ 371 (c)(1),
(2) Date: Jun. 23, 2022

(87) PCT Pub. No.: WO2021/138421
PCT Pub. Date: Jul. 8, 2021

(65) Prior Publication Data
US 2023/0011591 A1 Jan. 12, 2023

Related U.S. Application Data

(60) Provisional application No. 62/955,844, filed on Dec. 31, 2019.

(51) Int. Cl.
*H04S 7/00* (2006.01)
*H04R 5/02* (2006.01)

(52) U.S. Cl.
CPC ............... *H04S 7/303* (2013.01); *H04R 5/02* (2013.01); *H04R 2499/11* (2013.01); *H04S 2400/01* (2013.01); *H04S 2420/01* (2013.01)

(58) Field of Classification Search
CPC .. H04S 7/303; H04S 2400/01; H04S 2420/01; H04R 5/02; H04R 2499/11
(Continued)

(56) References Cited

U.S. PATENT DOCUMENTS

| | | | | |
|---|---|---|---|---|
| 2009/0123007 | A1* | 5/2009 | Katayama | H04S 7/302 381/300 |
| 2009/0310802 | A1 | 12/2009 | Zhang et al. | |

(Continued)

FOREIGN PATENT DOCUMENTS

| | | | |
|---|---|---|---|
| CN | 1630434 | A | 6/2005 |
| CN | 1937854 | A | 3/2007 |

(Continued)

OTHER PUBLICATIONS

Anonymous, "Amazon.com: Sonos In-Wall Speakers—Pair of Architectural Speakers by Sonance for Focused Listening", Feb. 5, 2019, 9 pgs., Retrieved from the Internet on Mar. 15, 2021, URL: https://www.amazon.com/Sonos-Wall-Speakers-Architectural-Listening/dp/B07MSVYYD8/ref=sr_1_4crid=2UA6UE3P7NQX&dchild=1&keywords=in-wall+speakers&qid=1615830389&sprefix=in-wall+,aps,253&sr=8-4.

(Continued)

*Primary Examiner* — Paul Kim
(74) *Attorney, Agent, or Firm* — Brooks Kushman P.C.

(57) ABSTRACT

In at least one embodiment, an apparatus for providing a virtual sound effect in a listening environment is provided. The apparatus includes at least one controller and an audio playback device. The audio playback device includes the at least one controller that is programmed to receive an audio input signal from an audio input source and to apply a head related transfer function (HRTF) to the audio input signal. The at least one controller is further programmed to apply crosstalk cancellation to the audio input signal and to
(Continued)

generate an audio output signal after applying the HRTF and the crosstalk cancellation to the audio input signal for playback by at least one loudspeaker that is invisible to a listener in the listening environment.

20 Claims, 4 Drawing Sheets

(58) Field of Classification Search
USPC .......................................................... 381/303
See application file for complete search history.

(56) References Cited

U.S. PATENT DOCUMENTS

| | | | | |
|---|---|---|---|---|
| 2015/0293655 A1* | 10/2015 | Tan | H04S 1/005 715/727 |
| 2019/0075397 A1* | 3/2019 | Riggi | H04S 7/301 |

FOREIGN PATENT DOCUMENTS

| | | |
|---|---|---|
| CN | 102246544 A | 11/2011 |
| JP | 2009124395 A | 6/2009 |
| TW | 200926803 A | 6/2009 |

OTHER PUBLICATIONS

Jot, J-M et al., "Digital Signal Processing Issues in the Context of Binaural and Transaural Stereophony", Feb. 25, 1995, 47 pgs., vol. 3980, No. 16.

Lorho, G. et al., "Subjective Evaluation of Virtual Home Theatre Sound Systems for Loudspeakers and Headphones", May 8-11, 2004, 17 pgs.

Vorlander, M., "16.2.4 Binaural Loudspeaker Technology", Oct. 26, 2007, 6 pgs.

International Preliminary Report on Patentability dated Jul. 14, 2022 for PCT Appn. No. PCT/US2020/067466 filed Dec. 30, 2020, 11 pgs.

International Search Report dated Mar. 25, 2021 for PCT Appn. No. PCT/US2020/067466 filed Dec. 30, 2020, 19 pgs.

First Chinese Office Action dated Aug. 7, 2024 for Chinese Application No. 202080091222.2 filed Jun. 29, 2022, 9 pgs.

First European Office Action dated Sep. 2, 2024 for European Application No. 20845542.8 filed Jun. 27, 2022, 9 pgs.

First Korean Office Action dated Nov. 28, 2024 for Korean Application No. 10-2022-7022376 filed Jun. 29, 2022, 5 pgs.

* cited by examiner

SYSTEM AND METHOD FOR VIRTUAL SOUND EFFECT WITH INVISIBLE LOUDSPEAKER(S)

CROSS-REFERENCE TO RELATED APPLICATIONS

This application is the U.S. National Phase of PCT/US2020/067466 filed Dec. 30, 2020, which claims the benefit of U.S. provisional application Ser. No. 62/955,844 filed Dec. 31, 2019, the disclosures of which are hereby incorporated in their entirety by reference herein.

TECHNICAL FIELD

Aspects disclosed herein generally relate to a system and method for providing a virtual sound effect with one or more loudspeakers. In particular, the embodiments disclosed herein may provide, but not limited to, a combination of a virtualizer and in-wall loudspeakers to provide a full surround sound experience without any visible loudspeakers.

BACKGROUND

Multi-channel systems are known to have a complex setup procedure and may be deeply influenced by the placement of loudspeakers. These issues may lead to an inconsistent sound field reproduction along with a notorious setup procedure and wires in the space. Moreover, literature on a spatial cross model suggests that visual modality may influence information from other senses. Some research indicates that vision dominates what we hear, when varying the degree of spatial congruency. Thus, vision may have a greater influence on integrated localization than hearing. If the listener can see the loudspeaker(s) and wires, the overall sound location perception may be greatly influenced.

A well-designed, all-in-one system, such as soundbar may reduce setup complexity. However, normally, these systems, due to form factor constrains, may suffer from lack of low frequency. Also, recent soundbars also tend to provide wider stereo image by using side wall reflections. Performance of such technology may be deeply influenced by the side walls and normally may require additional calibration procedure.

SUMMARY

In at least one embodiment, an apparatus for providing a virtual sound effect in a listening environment is provided. The apparatus includes at least one controller and an audio playback device. The audio playback device includes the at least one controller that is programmed to receive an audio input signal from an audio input source and to apply a head related transfer function (HRTF) to the audio input signal. The at least one controller is further programmed to apply crosstalk cancellation to the audio input signal and to generate an audio output signal after applying the HRTF and the crosstalk cancellation to the audio input signal for playback by at least one loudspeaker that is invisible to a listener in the listening environment.

In at least one embodiment, an apparatus for providing a virtual sound effect in a listening environment is provided. The apparatus includes at least one controller and an audio playback device. The audio playback device includes the at least one controller that is programmed to receive an audio input signal from an audio input source and to apply a head related transfer function (HRTF) to the audio input signal. The at least one controller is further programmed to apply crosstalk cancellation to the audio input signal and to generate an audio output signal after applying the HRTF and the crosstalk cancellation to the audio input signal. The at least one controller being further programmed to transmit the audio output signal to a first concealed loudspeaker and to a second concealed loudspeaker for playback in the listening environment with a surround sound experience.

In at least another embodiment, a method for providing a virtual sound effect in a listening environment is provided. The method includes receiving an audio input signal at an audio playback device from an audio input source and applying at least head related transfer function (HRTF) to the audio input signal. The method further includes applying crosstalk cancellation to the audio input signal and generating an audio output signal after applying the HRTF and the crosstalk cancellation to the audio input signal. The method further includes generating a location for at least one virtual loudspeaker in the listening environment to provide the effect that the at least one virtual loudspeaker is playing back the audio output signal while at least one concealed loudspeaker that is physically located in the listening environment plays back the audio output signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Figure 1:
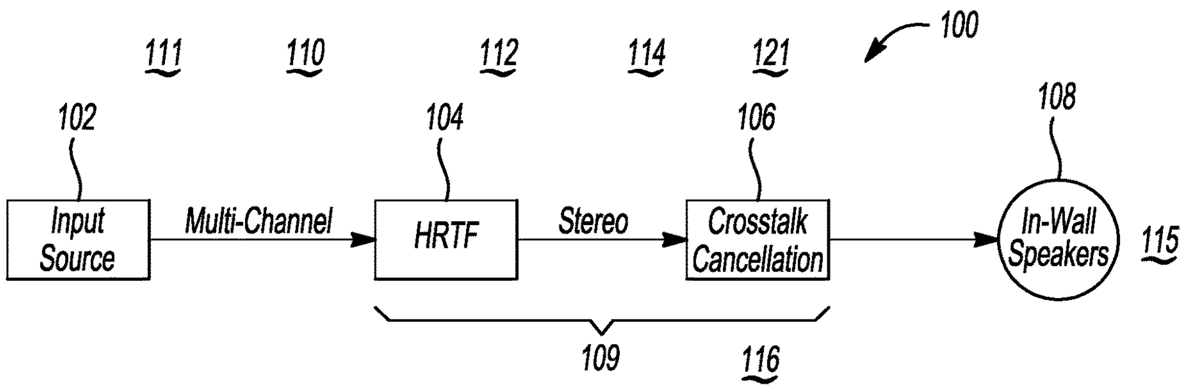
FIG. 1 generally depicts a system for providing a virtual sound effect with one or more loudspeakers in accordance to one embodiment.

FIG. 1 generally depicts a system 100 for providing a virtual sound effect with one or more loudspeakers in accordance to one embodiment. The system 100 generally includes an audio input source 102, a head related transfer function (HRTF) block 104, a crosstalk cancellation block 106, and at least one loudspeaker 108 (hereafter "the loudspeaker 108" or "the loudspeakers 108"). In one example, the at least one loudspeaker 108 (hereafter "the loudspeaker 108" or "the loudspeakers 108") may be defined as in-wall loudspeaker(s) and may be positioned behind a wall or other barrier and is completely concealed (i.e., completely invisible) from being physically viewed by the listener. Additionally or alternatively, the loudspeaker 108 may be positioned in a floor or ceiling. While referencing to the invisible characteristic of the loudspeaker 108, it is recognized that a loudspeaker grill that covers the loudspeaker 108 is also concealed or invisible and all that is visible to the listener is the wall, ceiling, or floor. In this case, there are no visual cues given to the listener with respect to the actual physical location of the loudspeaker 108.

It is recognized that the audio input source 102, the HRTF block 104, and the crosstalk cancellation block 106 may be incorporated into a single device such as an audio playback device 110. Alternatively, the audio play back device 100 may be distributed into a plurality of devices. The audio playback device 110 includes at least one controller 103 ("the controller 121") to execute any number of the operations as disclosed herein. In one example, the audio playback device 110 may correspond to a mobile device such as, but not limited to, a cell phone (e.g., smartphone, i-Phone®, etc.), a handheld computer (e.g., a personal digital assistant ("PDA"), etc.), a tablet (e.g., i-Pad®, etc.), a portable audio device (e.g., i-Pad®, etc.) or other suitable variant thereof. It is also recognized that the audio playback device 110 may be used in connection with a home audio system (e.g., TV, a media player such as, for example, a Blu-ray player, etc.) or for any system for that matter that generally plays back audio in a surround sound formal. In general, the crosstalk cancellation block 106 is configured to reproduce a desired signal at a single target position while cancelling out the sound at all remaining target positions.

The audio playback device 110 also includes a user interface 111 to enable listeners the ability to assign virtual locations for the loudspeaker(s) 108. This aspect will be discussed in more detail below. The audio playback device 110 may include any number of transceivers 112 to facilitate wireless communication such as the wireless receipt of audio data and/or to facilitate wireless transmission of audio data to the loudspeaker 108 for playback in a listening environment 115. The audio playback device 110 may utilize any number of wireless protocols to facilitate wireless communication. For example, the wireless protocol may include Bluetooth®, WiFi®, etc. The audio playback device 110 includes a controller 114 for executing code to enable the transmission of the audio data to the speakers 108. The audio data may be in the form of, but not limited to, the following file formats: wav, mp3, wma, etc. The audio playback device 110 is further configured to communicate via the WiFi connection to a server 116 in order to retrieve and store any number of the foregoing audio data for playback.

The audio playback device 110 may also be configured to transmit data to the loudspeaker 108 when the audio playback device 110 receives the data from an external source via the one or more of the transceivers 112. For example, the audio playback device 110 may receive the audio data as broadcast from a radio station (or tower) via frequency modulation (FM) or amplitude modulation (AM), etc. It is also recognized that the audio playback device 110 and the loudspeakers 108 may be integrated with at least one of the loudspeakers 108 and wirelessly communicate with any remaining loudspeakers 108.

The audio playback device 110 may be implemented in any system that utilizes, but not limited to, a surround sound format. The audio playback device 110 may be used as a virtual upmixer and create any number of artificial multi-channel sources. Various nonlimiting examples include 5.1 channels or 7.1 channels. With respect to surround sound, this may involve various loudspeakers that surround the listener. Surround sound may involve a technique that enriches the fidelity and depth of audio reproduction by using multiple audio channels from loudspeakers that surrounds one or more listeners. In general, aspects disclosed herein may provide a virtualizer 109 that is provided by the audio playback device 108 (e.g., via the HRTF block 104 and the crosstalk cancellation block 106) to deliver a full surround sound experience without visible loudspeakers 108. It is also recognized that aspects disclosed herein may apply to any number of multi-channel encoding techniques such as, but not limited to, Dolby®, THX®, etc.

For example, the virtualizer 109 may be defined as block that includes crosstalk cancellation (via the crosstalk cancellation block 106) and HRTF (via the HRTF block 108) to provide a stereo output that mimics a similar sensation of a fully calibrated multi-channel audio system. In one example, the audio input source 102 may decode audio input sources into multi-channel audio (e.g., 5.1, 7.1, etc.). The HRTF block 104 may position audio objects to a corresponding location in space utilizing HRTF. The HRTF generally corresponds to a transfer function that describes the manner in which sound from a sound source will arrive at an eardrum of a user. This may also include influencing the shape of the listener's outer ear, the shape of the listener's head and body, and the acoustic characteristics of the environment. The HRTF may also affect if a listener can accurately perceive what direction sound is coming from. The crosstalk cancellation block 106 may cancel out the stereo cross contamination terms to widen a sound field in the listening environment. In general, audio signals that include directional cues are to be reproduced at the ear's of the listener. However, crosstalk may smear these cues and adversely affect the localization of sound. Thus, crosstalk cancellation may be used so that sound from the loudspeakers 108 to contralateral ears may be minimized.

Figure 2:
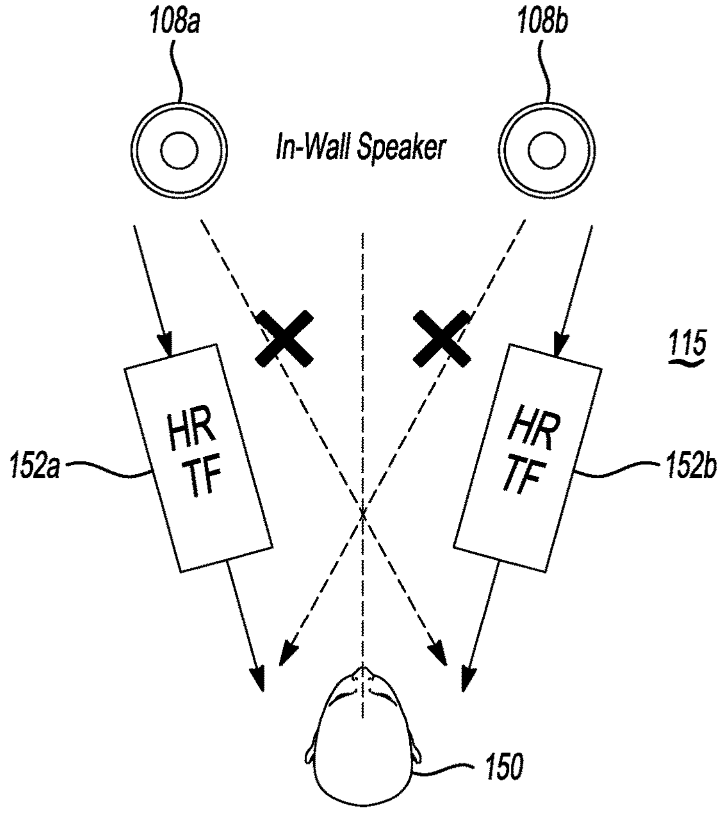
FIG. 2 depicts an overall principle of combining crosstalk cancellation and a head related transfer function (HRTF) in accordance to one embodiment.

FIG. 2 depicts an overall principle of combining crosstalk cancellation and HRTF in accordance to one embodiment. FIG. 2 generally depicts two loudspeakers 108$a$, 108$b$ that are positioned in front of a listener (or user) 150. First and second HRTFs 152$a$, 152$b$ are also shown in FIG. 2. In general, each of the HRTFs 152$a$, 152$b$ correspond to or describe the linear filtering of a sound signal in a free-field from different directions due to the physical propagation and scattering around a head of the listener 150. When represented in a time domain, the HRTFs 152$a$, 152$b$ may also be called Head Related Impulse Responses (HRIRs). Such HRIRs comprise special sound localization cues and may be used for the design and reproduction of spatial audio systems. Generally, the HRTFs 152$a$, 152$b$ correspond to filtering that is performed and measured to prevent reflections from walls, ceiling, and floor to affect the measured impulse responses. The HRTFs 152$a$, 152$b$ may first be characterized or established (i.e., or measured) and then stored in coded form within the HRTF block 104. The notion of combining crosstalk cancellation and HRTF with the in-wall (or concealed) loudspeakers 108 adds the effect that the audio is coming any number of different directions while the loudspeaker(s) 108 are concealed from the listener 150.

Figure 3:
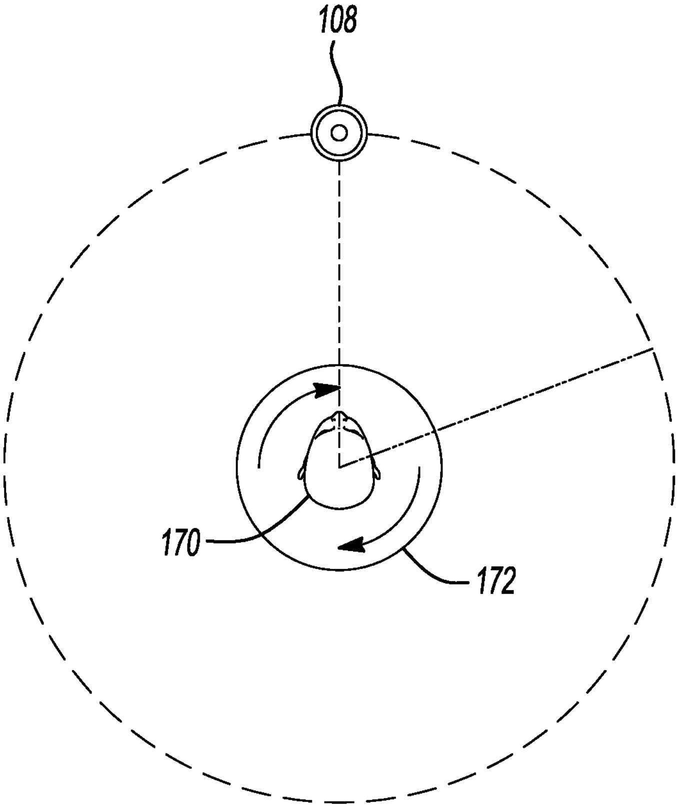
FIG. 3 depicts one schematic diagram of a measurement of the HRTF in accordance to one embodiment.

FIG. 3 depicts one schematic diagram of a measurement of the HRTF in accordance to one embodiment. The measurement of the HRTF may be performed in an anechoic chamber to prevent sound reflections from the ceiling, floor and walls. The listener 150 as illustrated in FIG. 2 is being replaced with a dummy head 170 in FIG. 3. In this case, two microphones (not shown) are placed within the dummy head 170 and the dummy head 170 is placed on a turntable 172. The dummy head 170 may be fixed at an origin of a coordinate system. Different angles of the HRTF may then be measured in the listening environment. Once the HRTF(s) are obtained, the audio playback device 112 may utilize digital filters (e.g., the HRTF block 104) to virtualize loudspeaker positions for different channels of the surround sound as illustrated in more detail in FIG. 4. For example, the input signals that are filtered by the HRTF block 104 may provide the direction of the sound image. With crosstalk cancellation, the real HRTFs in the actual system and environment are removed. In this case, the designed HRTF digital filters that form the HRTF block 104 may be developed and implemented according to a listener's (or manufacturers') desired virtual angles.

Figure 4:
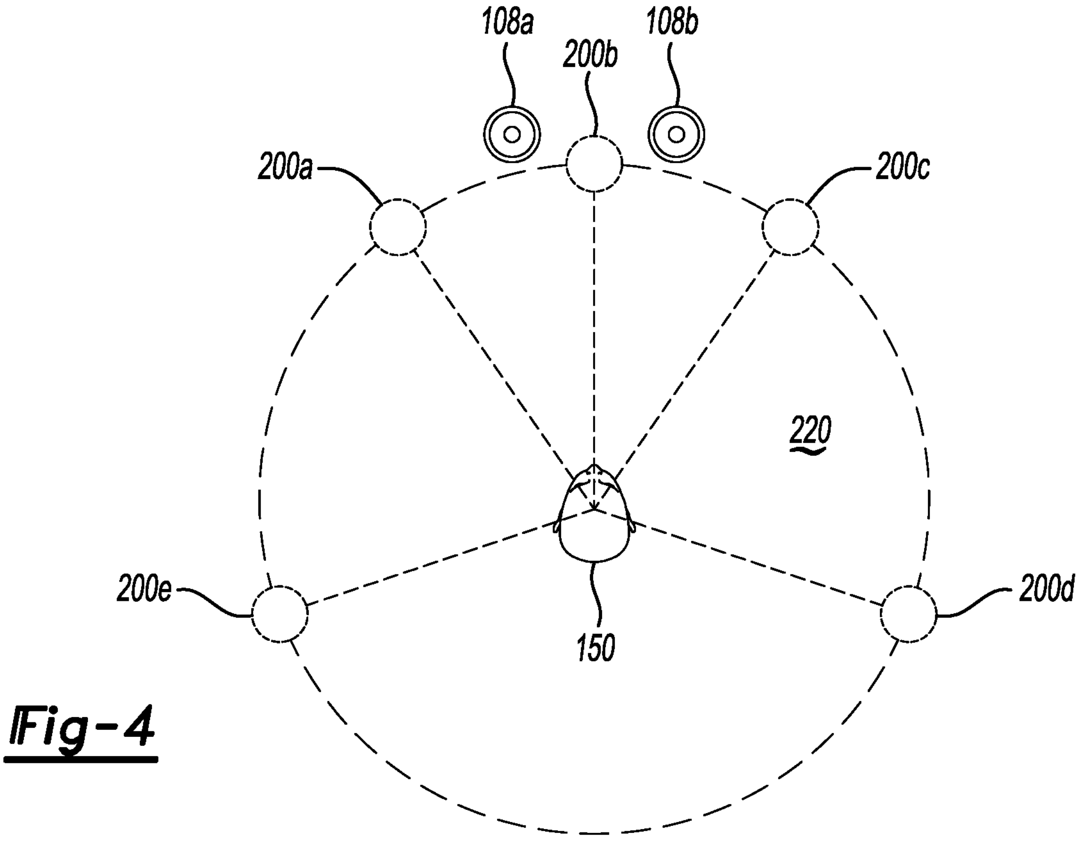
FIG. 4 depicts a virtualization of different channels by utilizing the HRTF in accordance to one embodiment.

FIG. 4 depicts positions for the actual loudspeakers 108$a$, 108$b$ and positions for virtual loudspeakers 200$a$-200$e$ for a surround sound system. In general, the virtual loudspeakers 200$a$-200$e$ correspond to sound images as perceived by the listener 150 in the surround sound system. The loudspeakers 108$a$, 108$b$ may be the loudspeakers that are truly playing back audio for the listener 150. However, the utilization of the HRTF block 104 that provides the HRTF(s) and the crosstalk cancellation block 106 that provides crosstalk cancellation which generates the virtual loudspeakers 200$a$-200$e$ (e.g., the sound images as perceived by the listener 150). For example, virtual loudspeaker 200$a$ may be perceived by the listener 150 to be a left loudspeaker within the listening environment 115, virtual loudspeaker 200$b$ may be perceived by the listener 150 to be a center loudspeaker within the listening environment 115, virtual loudspeaker 200$c$ may be perceived by the listener 150 to be a right loudspeaker within the listening environment 115, virtual loudspeaker 200$d$ may be perceived by the listener 150 to be a surround right loudspeaker within the listening environment 115, and virtual loudspeaker 200$e$ may be perceived by the listener 150 to be a surround left loudspeaker within the listening environment 115.

FIG. 4 generally depicts that the virtual loudspeakers 200$a$-200$e$ are arranged in a polar coordinate system 220 (e.g., 0 to 360 degrees). Thus, the audio playback device 102 may enable the listener 150 the ability to assign a position for each of the virtual loudspeaker 200$a$-200$e$ for any coordinate of the polar coordinate system 220 via the user interface 111. In this case, the HRTFs may be measured for every single (or one) degree up to 360 degrees. A listener 150 or designer may select one angle per one input channel as the virtual location (or virtual loudspeaker 200$a$-200$e$). By combining the selected angle at the measured HRTF with the crosstalk cancellation, the listener may not perceive the sound coming from the loudspeaker 108 but from the virtual loudspeaker 200$a$-200$e$. It is recognized that the user interface 111 may be in the form of a touch input device, voice command circuitry (e.g., microphones and circuitry that convert voice commands into electrical input signals) such a microphones, physical switches, or other suitable device that enables a listener 150 the ability to input information into an electrical device. In one example, the user interface 11 may graphically depicts the polar coordinate system 220 on a screen thereof and the listener 150 may simply assign the corresponding virtual loudspeaker 200$a$-200$e$ to a particular coordinate as illustrated in the system 220 as desired. It is recognized that aspects disclosed herein may alter the sound projection location as either a default position as indicated by, but not limited to, a surround standard (e.g., Dolby or Digital Theater Systems (DTS) surround loudspeaker position) or read custom user input(s) for each audio source as provided.

As noted above, in order to achieve wider sound field perception, the audio playback device 110 may employ the crosstalk cancellation block 106 to perform crosstalk cancellation. Thus, let us assume that G(rk) serves as the crosstalk cancellation function between the kth speaker and an optimized position r. The signals received by two cars are given by s, $$s=Hq \qquad \text{Eq. (1)}$$

where H is the transfer function between the cars of the listener 150 and the loudspeakers 108$a$, 108$b$, and q is the source strength, which may be written as, $$q=Gd \qquad \text{Eq. (2)}$$

where G is the matrix of G(rk) and d is the input signal. The error between the input signal and the received signal may be, $$e=d-s \qquad \text{Eq. (3)}$$

To minimize the error signals e, G may be given by:

$$G=[H^H H]^{-1}H^H \qquad \text{Eq. (4)}$$

To position audio objects to the corresponding location in space, the Eq. (4) may be modified as, $$G_T=C_F[H^H H]^{-1}H^H \qquad \text{Eq. (5)}$$

where $C_F$ is the matrix of the head-related transfer functions.

Figure 5:
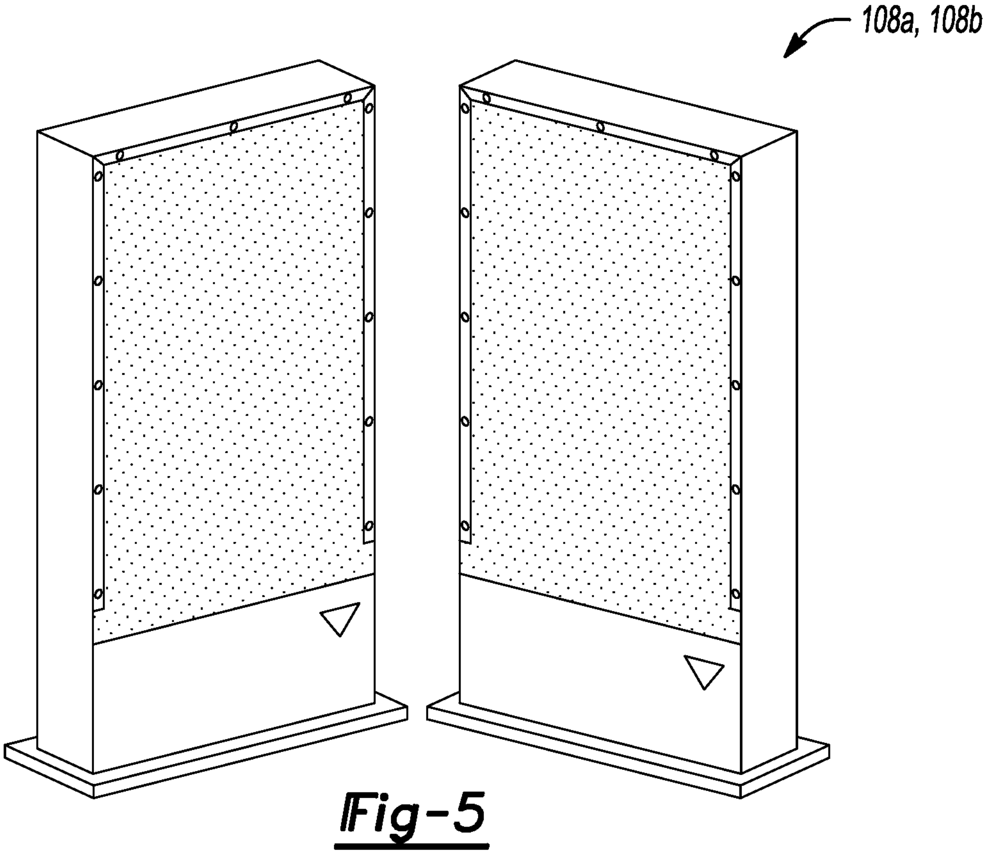
FIGS. 5 and 6 depict an example of acoustic surfaces on a front and back of loudspeaker arrangements in accordance to one embodiment.
Figure 6:
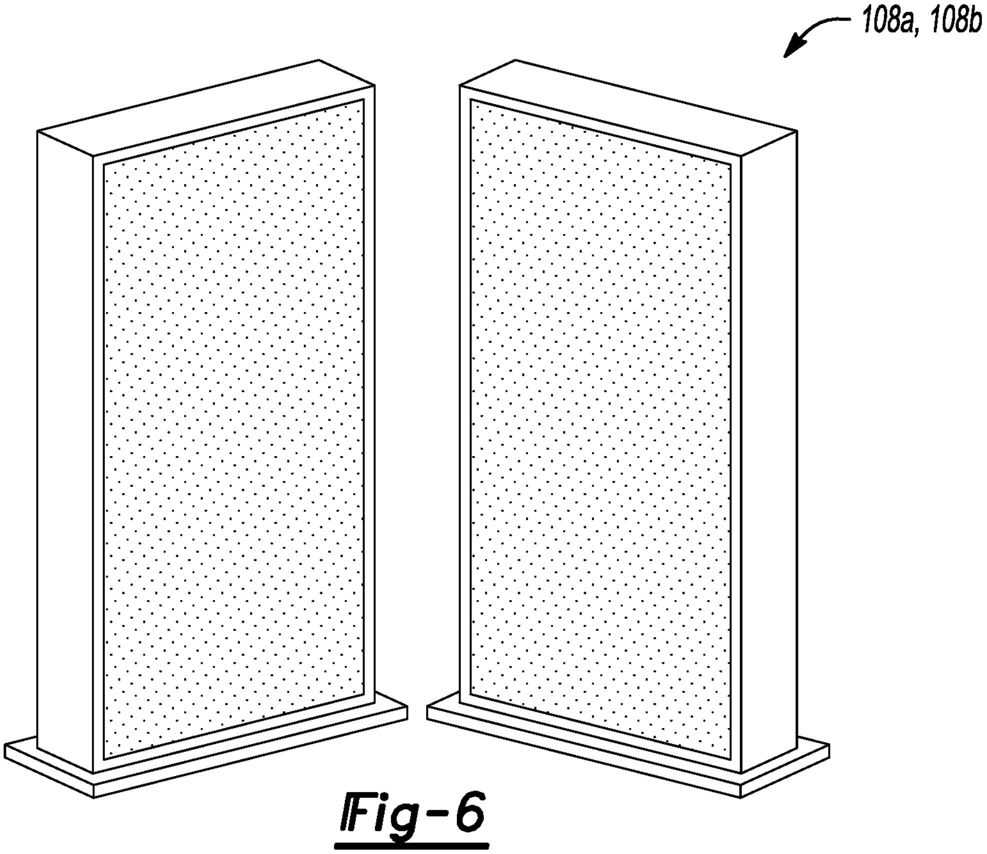

FIGS. 5 and 6 depict an example of acoustic surfaces on a front and back of loudspeaker arrangements in accordance to one embodiment. Such acoustic surfaces may be considered as a solution using actuators. The actuators may transmit vibrations to a surface to deliver sound. In general, the actuators may correspond to drivers that are configured to generate vibration based on an input signal. Such actuators may be connected to a surface that vibrates and then ultimately delivers audio. This implementation may offer various advantages. For example, sound comes from a surface. Therefore, it is possible to conceal drivers within the loudspeakers 108 and embed the loudspeakers 108 within a wall of a listening environment thereby creating an invisible loudspeaker. Regarding the spatial cross model, which may suggest that visual modality often influences information from hearing, the loudspeaker 108 may be hidden along with any wires so that the spatial feeling is influenced by the audio. Thus, when the loudspeaker 108 is presented with virtual surround audio, the resulting audio experience may be comparable to watching a film in a movie theater. Due to the substantial size of the emissive surface of the loudspeaker, this may be more advantageous than that of a soundbar or to a TV and the sound stage may be wide and immersive. There is research that indicates that vision dominates what is heard by the listener. Therefore, vision has a greater influence on integrated localization than hearing. However, if listeners don't see the loudspeakers and the wires of loudspeakers are kept concealed, their sound localization may be dominated by sound, or desirably the virtual sound images by using HRTF and crosstalk cancellation.

Figure 7:
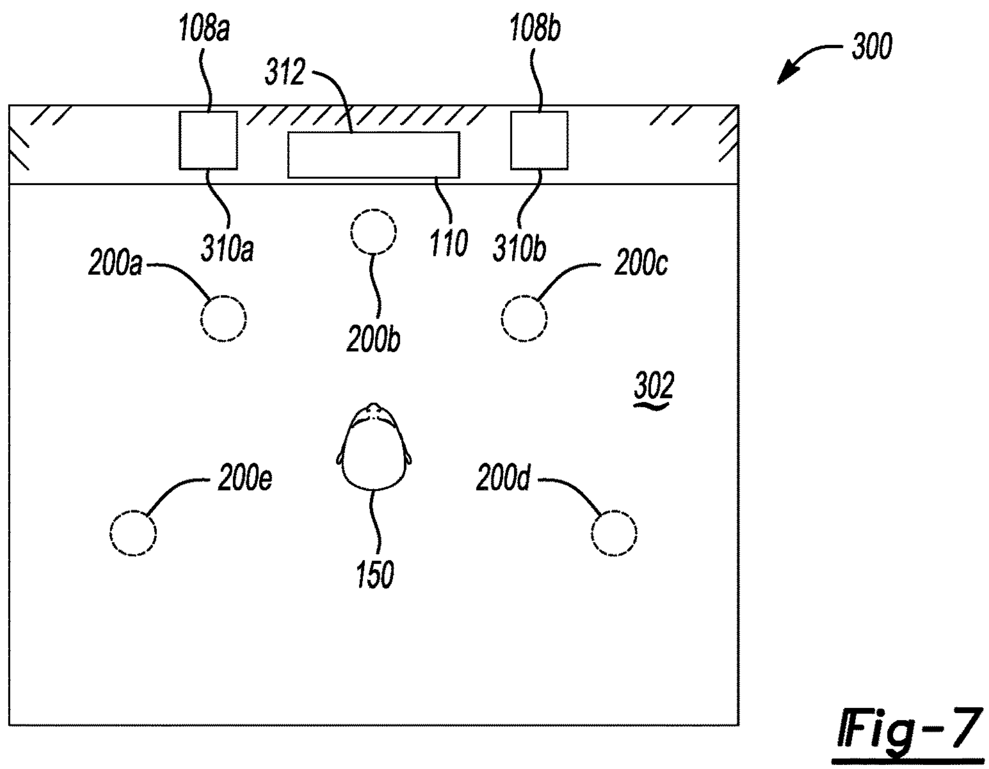
FIG. 7 depicts a loudspeaker setup in a listening environment in accordance to one embodiment.

FIG. 7 depicts a loudspeaker arrangement 300 in a listening environment 302 in accordance to one embodiment. In the arrangement 300, the audio playback device 110 may be positioned within a television set 312 to playback audio data. It is recognized that the audio playback device 110 may be positioned in a larger device that is generally situated to provide audio data. Acoustic surfaces 310*a*, 310*b* may be positioned on front sides of the loudspeakers 108*a*, 108*b*, respectively. By combining the virtualizer 109 in the audio playback device 110 along with the acoustic surfaces 310*a*, 310*b*, the arrangement 300 may be, for example, a fully immersive audio surround sound setup with a minimum setup procedure and may provide a visual and positive physical impact in the environment 302. As shown, the virtual loudspeakers 200*a*-200*e* are embedded within a wall and is invisible to the listener 150.

Figure 8:
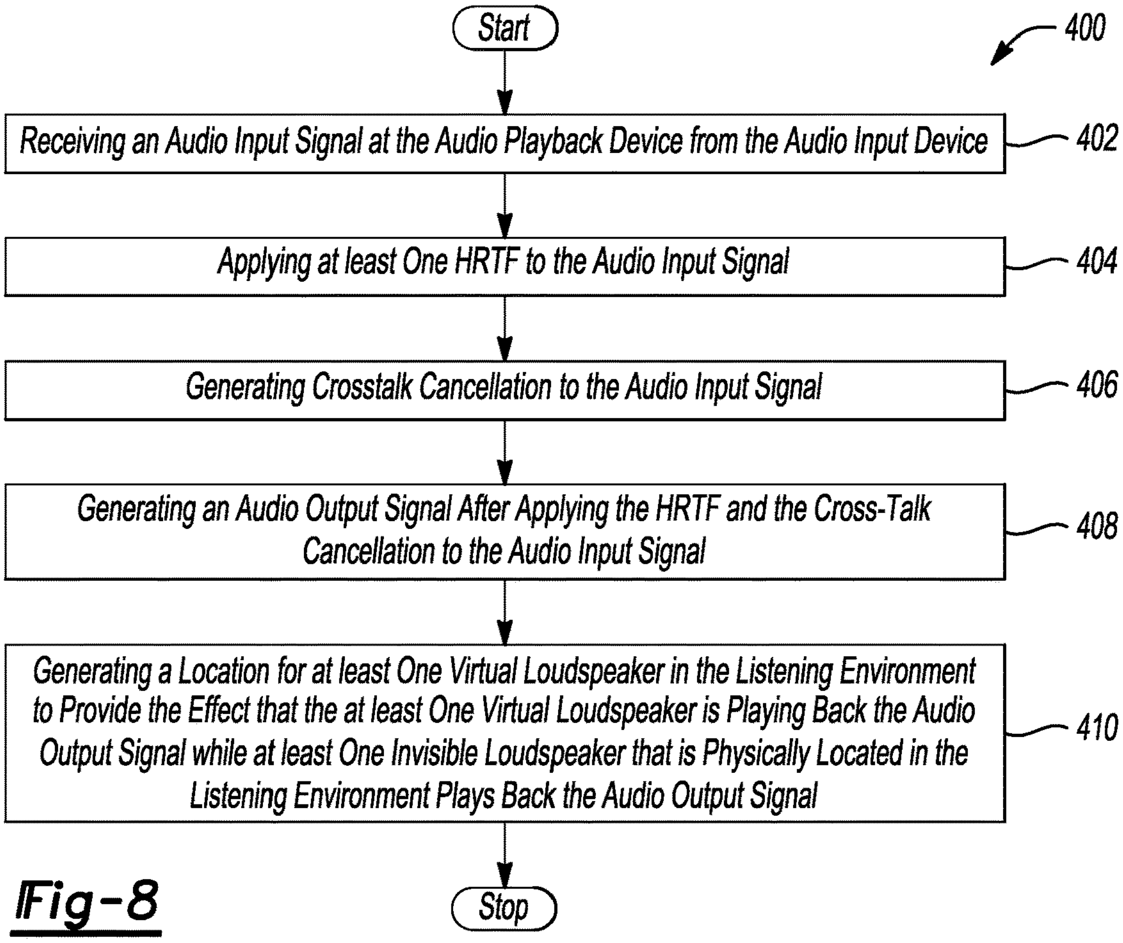
FIG. 8 depicts a method for providing a virtual sound effect in a listening environment in accordance to one embodiment.

FIG. 8 depicts a method 400 for providing a virtual sound effect in the listening environment 115 in accordance to one embodiment. In operation 402, the audio playback device 110 receives an audio input signal from the audio input source 102. As noted above, it is recognized that the audio input source 102 may be external to the audio playback device 110. In another example, the audio input source 102 may be internal to the audio playback device 110.

In operation 404, the audio playback device 110 applies the HRTF to the audio input signal. In operation 406, the audio playback device 110 applies the crosstalk cancellation to the audio input signal. In operation 408, the audio playback device 110 generates an audio output signal after applying the HRTF and the crosstalk cancellation to the audio input signal. In operation 410, the audio playback device 110 generates a location for at least one virtual loudspeaker 200*a*-200*e* in the listening environment 115 to provide the effect that the at least one virtual loudspeaker 200*a*-200*e* is playing back the audio output signal while the loudspeaker 108 in the listening environment 115 plays back the audio output signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for providing a virtual sound effect in a listening environment, the apparatus comprising:
- at least one controller; and
- an audio playback device including the at least one controller that is programmed to:
  - receive an audio input signal from an audio input source;
  - apply a head related transfer function (HRTF) to the audio input signal;
  - apply crosstalk cancellation to the audio input signal; and
  - generate an audio output signal after applying the HRTF and the crosstalk cancellation to the audio input signal for playback by at least one loudspeaker that is invisible to a listener in the listening environment,
- wherein the HRTF as applied by the audio playback device corresponds to at least filtering that is performed and measured to prevent reflections of audio from a wall, ceiling or a floor of a listening environment.

2. The apparatus of claim 1, wherein the audio playback device is further programmed to decode multi-input channels on the audio input signal into multi-channel audio prior to applying the HRTF and the crosstalk cancellation to the audio input signal.

3. The apparatus of claim 2, wherein the audio playback device is further programmed to decode the multi-input channels for a surround sound system.

4. The apparatus of claim 1, wherein the audio playback device includes a user interface to receive an input indicative of a location of a virtual loudspeaker to provide a perception that the listener is receiving the audio output signal at the location of the virtual loudspeaker.

5. The apparatus of claim 4, wherein the input corresponds to the location of the virtual loudspeaker in a polar coordinate system.

6. The apparatus of claim 1, wherein the at least one loudspeaker is positioned in one of a wall, ceiling, and floor to cause the at least one loudspeaker to be invisible to the listener.

7. The apparatus of claim 1, wherein the HRTF is measured and then stored as code in memory of the audio playback device prior to the audio playback device applying the HRTF and the crosstalk cancellation to the audio input signal.

8. An apparatus for providing a virtual sound effect in a listening environment, the apparatus comprising:
- at least one controller; and
- an audio playback device including the at least one controller that is programmed to:
  - receive an audio input signal from an audio input source;
  - apply at least head related transfer function (HRTF) to the audio input signal;
  - apply crosstalk cancellation to the audio input signal; and
  - generate an audio output signal after applying the HRTF and the crosstalk cancellation to the audio input signal; and
  - transmit the audio output signal to a first concealed loudspeaker and to a second concealed loudspeaker for playback in the listening environment with a surround sound experience, wherein the at least HRTF as applied by the audio playback device corresponds to at least filtering that is performed and measured to prevent reflections of audio from a wall, ceiling or a floor of a listening environment.

9. The apparatus of claim 8, wherein the audio playback device is further programmed to decode multi-input channels on the audio input signal into a multi-channel audio prior to applying the HRTF and the crosstalk cancellation to the audio input signal.

10. The apparatus of claim 9, wherein the audio playback device is further programmed to decode the multi-input channels for a surround sound system.

11. The apparatus of claim 8, wherein the audio playback device includes a user interface to receive an input indicative of a location of a virtual loudspeaker to provide a perception that the listener is receiving the audio output signal at the location of the virtual loudspeaker.

12. The apparatus of claim 11, wherein the input corresponds to the location of the virtual loudspeaker in a polar coordinate system.

13. The apparatus of claim 8, wherein at least one of the first concealed loudspeaker and the second concealed loudspeaker is positioned in one of a wall, ceiling, and floor to cause the at least one of the first concealed loudspeaker and the second concealed loudspeaker to be concealed to the listener.

14. The apparatus of claim 8, wherein the HRTF is measured and then stored as code in memory of the audio playback device prior to the audio playback device applying the HRTF and the crosstalk cancellation to the audio input signal.

15. A method for providing a virtual sound effect in a listening environment, the method comprising:

receiving an audio input signal at an audio playback device from an audio input source;

applying at least head related transfer function (HRTF) to the audio input signal;

applying crosstalk cancellation to the audio input signal;

generating an audio output signal after applying the HRTF and the crosstalk cancellation to the audio input signal; and generating a location for at least one virtual loudspeaker in the listening environment to provide the effect that the at least one virtual loudspeaker is playing back the audio output signal while at least one concealed loudspeaker that is physically located in the listening environment plays back the audio output signal, wherein applying the at least HRTF to the audio input signal corresponds to at least filtering that is performed and measured to prevent reflections of audio from a wall, ceiling or a floor of a listening environment.

16. The method of claim 15 further comprising decoding multi-input channels on the audio input signal into a multi-channel audio prior to applying the HRTF and the crosstalk cancellation to the audio input signal.

17. The method of claim 16, wherein decoding the multi-input channels further includes decoding the multi-input channel for a surround sound system.

18. The method of claim 15 further comprising receiving an input via a user interface indicative of the location of the at least one virtual loudspeaker.

19. The method of claim 18, wherein the input corresponds to the location of the virtual loudspeaker in a polar coordinate system.

20. The method of claim 15, wherein the at least one concealed loudspeaker is positioned in one of a wall, ceiling, and floor.

* * * * *